(12) United States Patent
Hsu (10) Patent No.: US 12,141,102 B2
(45) Date of Patent: Nov. 12, 2024

(54) CONTAINER SYSTEM, METHOD OF DYNAMICALLY MOUNTING HOST DATA TO CONTAINER, AND APPLICATION PROGRAM FOR THE SAME

(71) Applicant: QNAP SYSTEMS, INC., New Taipei (TW)

(72) Inventor: Chin-Hsing Hsu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 86 days.

(21) Appl. No.: 17/861,988

(22) Filed: Jul. 11, 2022

(65) Prior Publication Data

US 2023/0214361 A1 Jul. 6, 2023

(30) Foreign Application Priority Data

Jan. 6, 2022 (TW) .................................. 111100615

(51) Int. Cl.
*G06F 17/00* (2019.01)
*G06F 7/00* (2006.01)
(Continued)

(52) U.S. Cl.
CPC ............ *G06F 16/176* (2019.01); *G06F 9/547* (2013.01); *G06F 16/185* (2019.01)

(58) Field of Classification Search
CPC ....... G06F 16/176; G06F 16/185; G06F 9/547
(Continued)

(56) References Cited

U.S. PATENT DOCUMENTS

2008/0165957 A1* 7/2008 Kandasamy ........ G06F 21/6218
713/175
2009/0089395 A1* 4/2009 Fen ......................... G06F 15/16
709/216
(Continued)

FOREIGN PATENT DOCUMENTS

| CN | 107885748 A | 4/2018 |
| CN | 111679887 A | 9/2020 |
| CN | 112799780 A | 5/2021 |

OTHER PUBLICATIONS

Office Action dated Aug. 23, 2022 of the corresponding Taiwan paten application 111100615.
(Continued)

*Primary Examiner* — Pavan Mamillapalli
(74) *Attorney, Agent, or Firm* — Chun-Ming Shih; HDLS IPR SERVICES (57) ABSTRACT

A container system is disclosed. The container system includes a host, a daemon and an API server running in the containers of the host, and a container manager running in the host. The host has a file system. The container manager creates a source directory in the file system and mounts the source directory to a share directory of the daemon. The API server receives a request command with respect to a target directory in the file system, and the container manager bind-mounts the target directory to a sub-directory of the source directory according to the request command. In addition, the container manager responds the API server the location of the target directory in the share directory for accessing the required data through the share directory in the containers.

15 Claims, 9 Drawing Sheets

(51) Int. Cl.
*G06F 9/54* (2006.01)
*G06F 16/176* (2019.01)
*G06F 16/185* (2019.01)

(58) Field of Classification Search
USPC .......................................................... 707/829
See application file for complete search history.

(56) References Cited

U.S. PATENT DOCUMENTS

2009/0313259 A1* 12/2009 Ivanovic ............... G06F 16/176
707/999.01
2015/0324255 A1* 11/2015 Kochunni ............. G06F 3/0626
711/162
2020/0301791 A1* 9/2020 Zhang .................... G06F 9/455
2021/0303511 A1* 9/2021 Karr .................... G06F 16/1824
2021/0303528 A1* 9/2021 Meister ................ G06F 16/162

OTHER PUBLICATIONS

Office Action dated Dec. 27, 2022 of the corresponding Taiwan paten application 111100615.

* cited by examiner

CONTAINER SYSTEM, METHOD OF DYNAMICALLY MOUNTING HOST DATA TO CONTAINER, AND APPLICATION PROGRAM FOR THE SAME

BACKGROUND OF THE DISCLOSURE

Technical Field

The disclosure relates to a container, particularly relates to a container system used for a host, a method of dynamically mounting the host data to the container, and an application program for the same.

Description of Related Art

The container is a technology of virtualizing the operating system. Multiple containers may be run in one host depending on the needs, and the containers may be used to execute operations, such as small-scale service, small-scale procedure or even large-scale application program. Specifically, one container includes the process, library, and configuration file (or config) required for executing the application program, but does not include the operating system image. Therefore, the container may be lightweight and portable.

The main feature of the container technology is that the execution environment of the application program may be isolated, and the execution of the application program in the container may not influence the external environment of the container. For example, if multiple application programs need to use the libraries of different versions, the user may make the application programs respectively execute in different containers, and thus the conflicts between the libraries of different versions required by the application programs may be overcame.

Under normal circumstances, the execution period after the container being instantiated is short, and the container is terminated without storing data to a persistent storage after the mission is achieved (for example, the designated procedure is already executed). In that condition, the related information of the container is not being stored, thereby being indicated as stateless container. Some procedures executed in the container are exceptional (for example, the software used for connecting different communication protocol, such as NFS-ganesha, Samba, etc.), thereby the execution period being longer and rarely being terminated. In that condition, the related information of the container may be stored to a persistent storage, thereby being indicated as stateful container.

The application program in the stateful container may be divided into a control path and a data path in the architecture. The control path is used for providing the application program interface (API) to the administrators for system management (for example, connecting through the Internet) with respect to the application program. The data path is used for sharing the corresponding data according to the commands requested from the control path. The control path provides the channel for the external connections to the container; therefore, the container is relatively easier subject to attacks by the hackers.

The container may package the execution environment of the application program to isolate the program from the external environment. However, the execution of the application program still needs to access data in the host. Further, when the container is instantiated, the system is not able to predict what data the application program needs in advance. If the developers mounts all of the storages of the host to the container or improperly grants the privilege of unrestricted searching and mounting rights to the arbitrary storages of the container for the sake of convenience, the hacker may obtain all data of the file system (FS) in the host once he hacks the container through the control path. As a result, the original purpose of the container for isolating the execution environment and the host environment is violated and the information security risk is increased.

Figure 1:
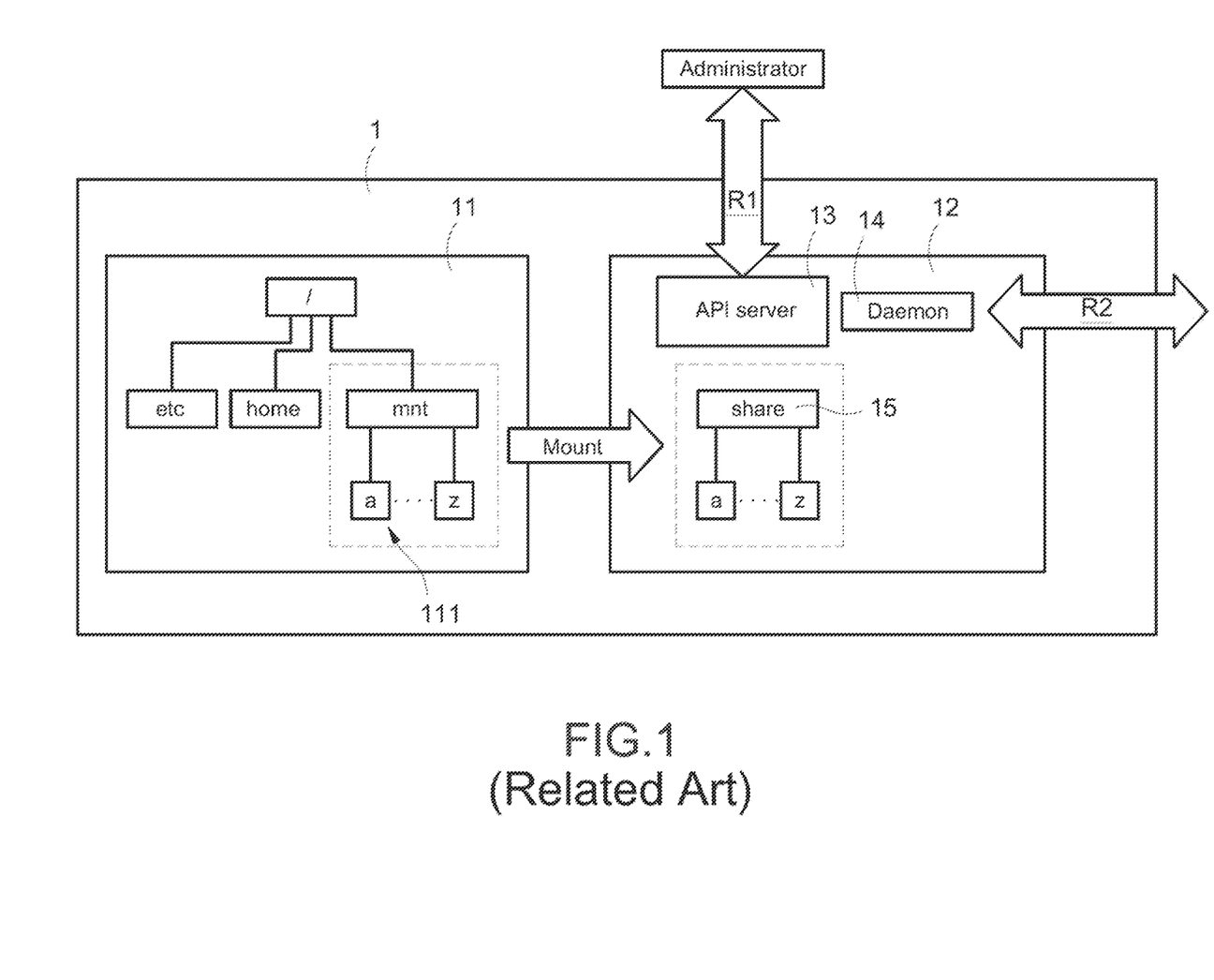
FIG. 1 is a schematic diagram of using the container in the host.

Referring to FIG. 1, which is a schematic diagram of using the container in the host. As shown in FIG. 1, the host 1 has a file system 11 consisting of a plurality of directories and is capable of running at least one container 12. At least one application program runs in the container 12. In the FIG. 1, the application program is divided into an API server 13 and a daemon 14 in the architecture. The API server 13 provides the control path R1 to external, and the daemon provides the data path R2.

As mentioned above, because it is impossible to predict what data of host 1 will be accessed by the running application program in the future, some developers may directly mount the entire file system 11 to the share directory 15 in the container 12 for the sake of convenience. Under that condition, if the hacker hacks the container 12 through the control path R1, the hacker may obtain all data in the host 1 directly through the share directory 15.

On the other hand, some developers may directly grant improper privilege of unrestricted searching and mounting rights to the container 12 for the sake of convenience. Under that condition, if the hacker hacks the container 12 through the control path R1, the hacker may search and obtain all data in the host 1 through specific commands. Once the aforementioned conditions happen, the isolation mechanism for the container 12 is in vain.

In view of this, the inventors have devoted themselves to the aforementioned related art, researched intensively try to solve the aforementioned problems.

SUMMARY OF THE DISCLOSURE

The main purpose of the disclosure is to provide a container system for a host, a method of dynamically mounting the host data to the container, and an application program for the same, which may dynamically mount the specific data in the host to the container when the container needs to lower the risk of leaking the internal data of the host.

In order to achieve the purpose, the container system of the disclosure includes:

a host, having a file system consisting of a plurality of directories;

a daemon, configured to run in a container of the host, and the container having at least one share directory;

a container manager, configured to run in the host, create a source directory in the file system, and mount the source directory to the share directory; and an application programming interface server (API server), configured to receive a request command for a target directory in the file system from an external administrator, and transfer the request command to the container manager, wherein the container manager is configured to bind-mount the target directory to a source sub-directory of the source directory according to the request command and respond the API server about a location of the target directory in the share directory, and the container is configured to share the target directory through the share directory for internal computations or access of external users.

In order to achieve the purpose, the method of the disclosure includes:

a1) the container manager creating a source directory in the file system;

a2) the container manager mounting the source directory to a share directory of the container;

a) the container manager receiving a request command from the API server, wherein the request command is input by an external administrator with respect to a target directory in the file system;

b) the container manager bind-mounting the target directory to a source sub-directory of the source directory according to the request command; and c) after b), the container manager responding the API server about a location of the target directory in the share directory to make a container share the target directory through the share directory for internal computations or external users.

In order to achieve the purpose, the application program of the disclosure has a computer executable code, after the computer executable code is executed by a host, the method mentioned above is implemented.

The technical effects of the disclosure comparing to the related technology is as below. The container manager may dynamically provide the specific data in the host to the running container, thereby lowering the amount of host data which may be accidentally exposed. Further, the container manager does not need to terminate the container and modify the configuration file in advance for recreating the container, and thus the security and convenience may be fulfilled simultaneously.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 2:
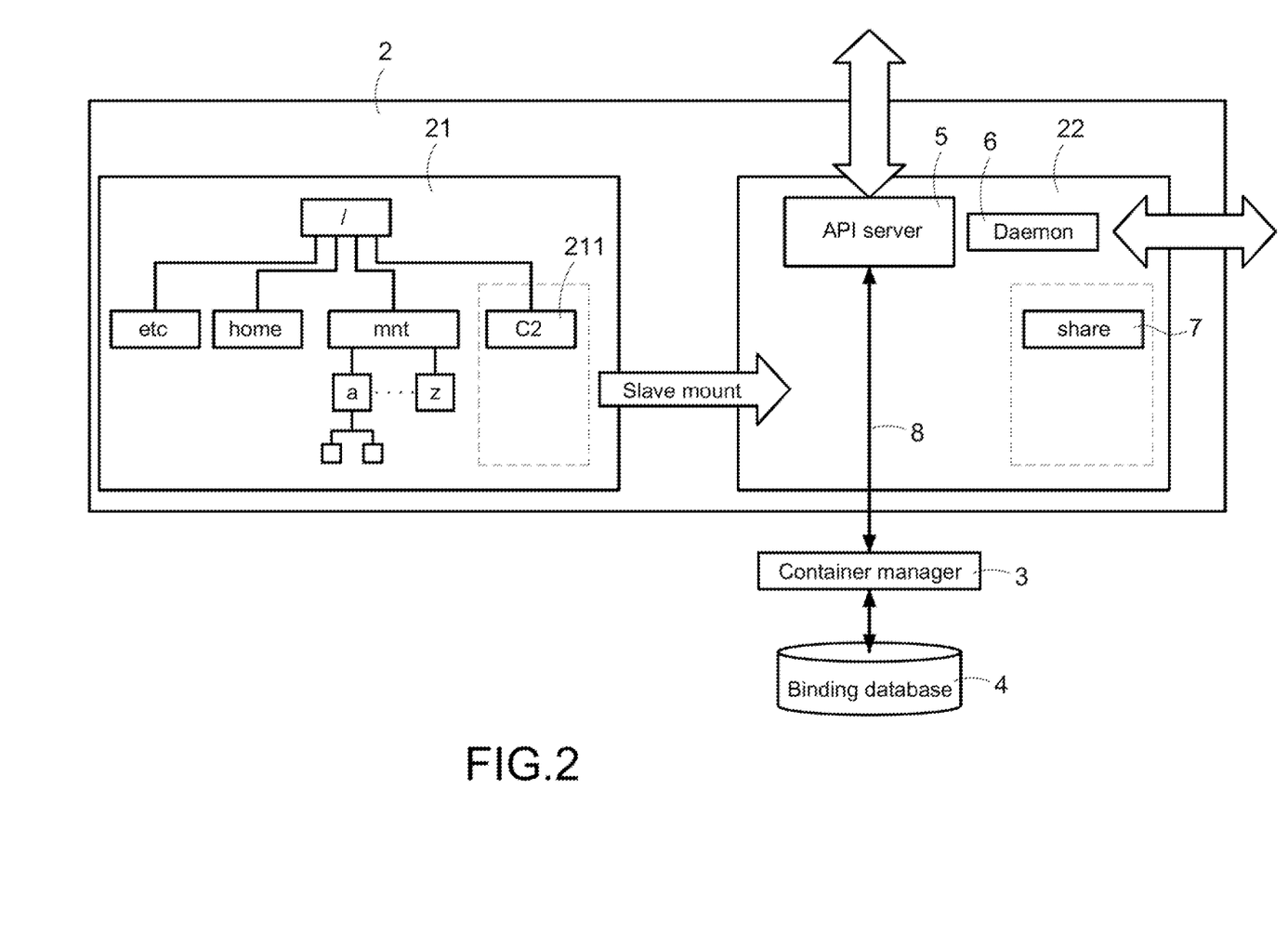
FIG. 2 is a schematic diagram of the first embodiment of the container system in the disclosure.

Please refer to FIG. 2, which is a schematic diagram of the first embodiment of the container system in the disclosure. As shown in FIG. 2, a container system for a host is provided. The container system includes a host 2, a container manager 3, an application program interface server (API server) 5 and a daemon 6. The container manager 3, the API server 5 and the daemon 6 are configured to run in the host 2. The host 2, for example, may be the computer equipment, such as the personal computer (PC), laptop (or notebook computer), industrial PC (IPC), or server, etc., here is not intended to be limiting. In some embodiments, the container manager 3 is a service in the host 2 and configured to run in the host 2. The API server 5 and the daemon 6 are configured to run in at least one container 22 of the host 2.

The detail description for the container 22 is omitted here for brevity.

Specifically, the API server 5 and the daemon 6 may be different modules of the same application program and divided in the architecture. When the application program is being executed, the host 2 is configured to instantiate the container 22 through the container manager 3 and run the application program in the container 22. Thus, the execution environment of the application program (that is, the API server 5 and the daemon 6) is isolated from the external environment of the container 22 to prevent from influencing each other.

In some embodiments, the API server 5 is used for providing a control path to external (for example, through the Internet), and the daemon 6 is used for providing a data path. The data path may be provided to external or internal, here is not intended to be limiting. The administrator may input the commands to the API server 5 through the control path to control the operations of the daemon 6 in the container 22 and to get required information. Further, the administrator or the other authorized users may obtain the related data shared by the daemon 6 through the data path.

In some embodiments, the daemon 6 is a software which implements specific communication protocols (for example, server message block (SMB) protocol and common Internet file system (CIFS) protocol), such as NFS-ganesha or Samba etc., here is not intended to be limiting. The detail description of the NFS-ganesha and Samba is omitted here for brevity.

The host 2 internally has a file system (FS) 21 consisting of a plurality of directories. As shown in FIG. 2, the FS 21 is in a hierarchical structure, and includes the directories, such as "etc", "home", "mnt", etc., under the root directory (/). The "mnt" directory further includes the sub-directories, such as "a", "b", . . . , "z". The directory names of the aforementioned directories and sub-directories are illustrative, here is not intended to be limiting.

As shown in FIG. 2, the daemon 6 in the container 22 may access share directory 7 of the container 22, for example, the "share" directory in the FIG. 2. When the administrator or the other authorized users obtains data from the daemon 6 through the data path, the administrator may solely obtain data under the share directory 7. Specifically, the directory name of the "share" directory may be regularly used for indicating the directory is a shareable directory, when the daemon 6 is configured to share data.

One technical feature of the disclosure is that, when the container 22 is instantiated, the container system makes the share directory 7 only mount minimal contents of the host (in the embodiment of FIG. 2, no subdirectories exist in the share directory 7), and when the administrator has sharing needs, the required data is dynamically mounted to the share directory 7 by the container manager 3 from the FS 21. Therefore, the risk of leaking critical data in the FS 21 of the host through the share directory 7 due to the control path being hacked by the hacker may be avoided.

Specifically, the container manager 3 of the disclosure may create a source directory 211 in the FS 21 of the host in advance, before the container 22 is instantiated. The source directory 211 is indicated by the directory name of "C2" in FIG. 2 as an example. The directory name of the source directory 211 does not have any substantial indication, and may be manually configured by the administrator, or may be an arbitrary one randomly generated by the container manager 3, here is not intended to be limiting.

When the container 22 is instantiated, the container manager 3 is configured to mount the source directory 211 in the FS 21 of the host 2 to the share directory 7 in the container 22 (that is, mounting "/C2" directory to "/share" directory). In some embodiments, the container manager 3 is configured to mount the source directory 211 to the share directory 7 in a slave-mounting manner. By the characteristics of the slave-mounting mechanisms, when a directory in the FS 21 is bind-mounted to a source sub-directory under the source directory 211, the bind-mounting relation automatically appears on the share directory 7. Therefore, when the directory is bind-mounted to the source sub-directory under the source directory 211, the directory automatically appears on a share sub-directory under the share directory 7 (detailed as follows).

As shown in FIG. 2, the API server 5 is configured to receive the request command from the external administrator through the control path. In some embodiments, the request command may be, for example, the input from the administrator with respect to a specific target directory in the FS 21. In the disclosure, the API server 5 does not directly execute the request command but forwards the request command to the container manager 3.

In some embodiments, the container manager 3 communicates with the API server 5 through an inter-process communication (IPC) 8. Therefore, the API server 5 may forwards the request command to the container manager 3 through the IPC 8.

Specifically, the system may configure the container manager 3 to use local communication endpoints, such as Unix domain sockets, or IPC sockets to deploy the IPC 8, and thus the container manager 3 is restricted to receive and serve the request from the local trust domain through the IPC 8. By the usage of the IPC 8, even if the API server 5 is hacked by the hacker, the risk of the hacker attacking the container manager 3 is still avoided because the container manager 3 is not exposed to the Internet.

As mentioned above, the source directory 211 of the disclosure is mounted to the share directory 7 by the container manager 3, and the container manager 3 is configured to locate content of the FS 21 through the command. In order to implement the operation, the host 2 needs to assign certain level of privilege for the container manager 3. The privilege given to the container manager 3 is high, the damage to the host 2 will be extreme once the container manager 3 is hacked by the hacker. In order to prevent the container manager 3 from being hacked, the container manager 3 may only communicate with the other modules through the IPC 8.

It is worth mentioning that the IPC 8 may lower the risk of the hacker hacking the container manager 3 through the API server 5, but if the API server 5 and daemon 6 run in the same container 33, the hacker may still hack the daemon 6 through the API server 5.

Specifically, if the software modules which implement the data path and the control path respectively are deployed in the same container 22, the data being shared through the data path is also accessible to the control path. Since the control path may be connected to the Internet, the control path may be constantly attacked by the hackers. Under that circumstance, if any directory in the FS 21 is being mounted to the share directory 7, the hacker may be able to access the other data in the FS 21 of the host 2 through the share directory 7. Regarding that, the disclosure provides another technical solution, that is to make the API server 5 and the daemon 6 respectively run in the different containers 22 for lowering the aforementioned risk.

Figure 3:
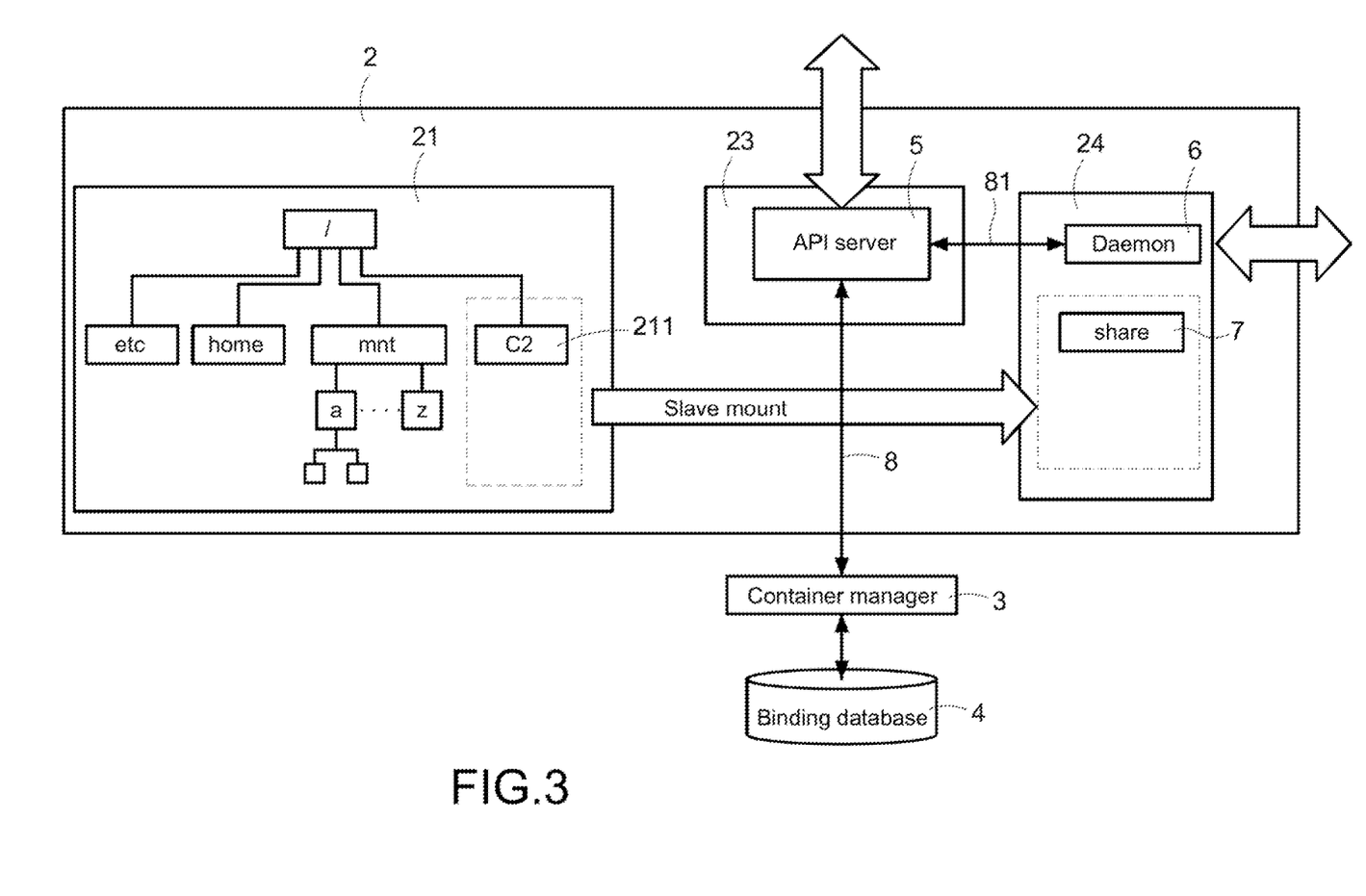
FIG. 3 is a schematic diagram of the second embodiment of the container system in the disclosure.

Please refer to FIG. 3, which is a schematic diagram of the second embodiment of the container system in the disclosure. FIG. 3 discloses another embodiment of the container system of the disclosure. The differences between the embodiments in FIG. 3 and FIG. 2 are that the container manager 3 is configured to instantiate the first container 23 and the second container 24, which run the API server 5 and the daemon 6 respectively.

As shown in FIG. 3, the API server 5 in the first container 23 is configured to communicate with the container manager 3 through the IPC 8, and further communicate with the daemon 6 in the second container 24 through another IPC 81. The embodiment in FIG. 3 may further lower the risk of data in the host 2 being exposed externally by the characteristic of the IPCs 8, 81 because only requests from the local trust domain are accepted and served, and also because the API server is made to solely mount minimal host directories (not shown in figures).

It is worth mentioning that the IPC 8 (for example, may be indicated as the first IPC) used between the API server 5 and the container manager 3 and the IPC 81 (for example, may be indicated as the second IPC) used between the API server 5 and the daemon 6 are independent from each other, and may be implemented by adopting different local IPC mechanisms, here is not intended to be limiting.

Specifically, the container manager 3 only needs to implement one kind of IPC 8 to serve various kinds of API servers 5 (for example, Samba, or nfs, etc., has its own API server). On the other hand, the IPC 81 between the API server 5 and daemon 6 may adopt different practices according to the nature of the software and practical needs. For example, the IPC 81 is adopted between the API server 5 of Samba and the daemon 6, and may be different with the IPC 81 between the API server 5 of nfs and the daemon 6. Specifically, the IPCs 8, 81 may use different communication mechanisms to exchange information. Even the same communication mechanism is used, the available IPC commands may be different depending on the required information exchanges between the API server 5 and the daemon 6.

It should be noted that here is not intended to be limiting.

Figure 4:
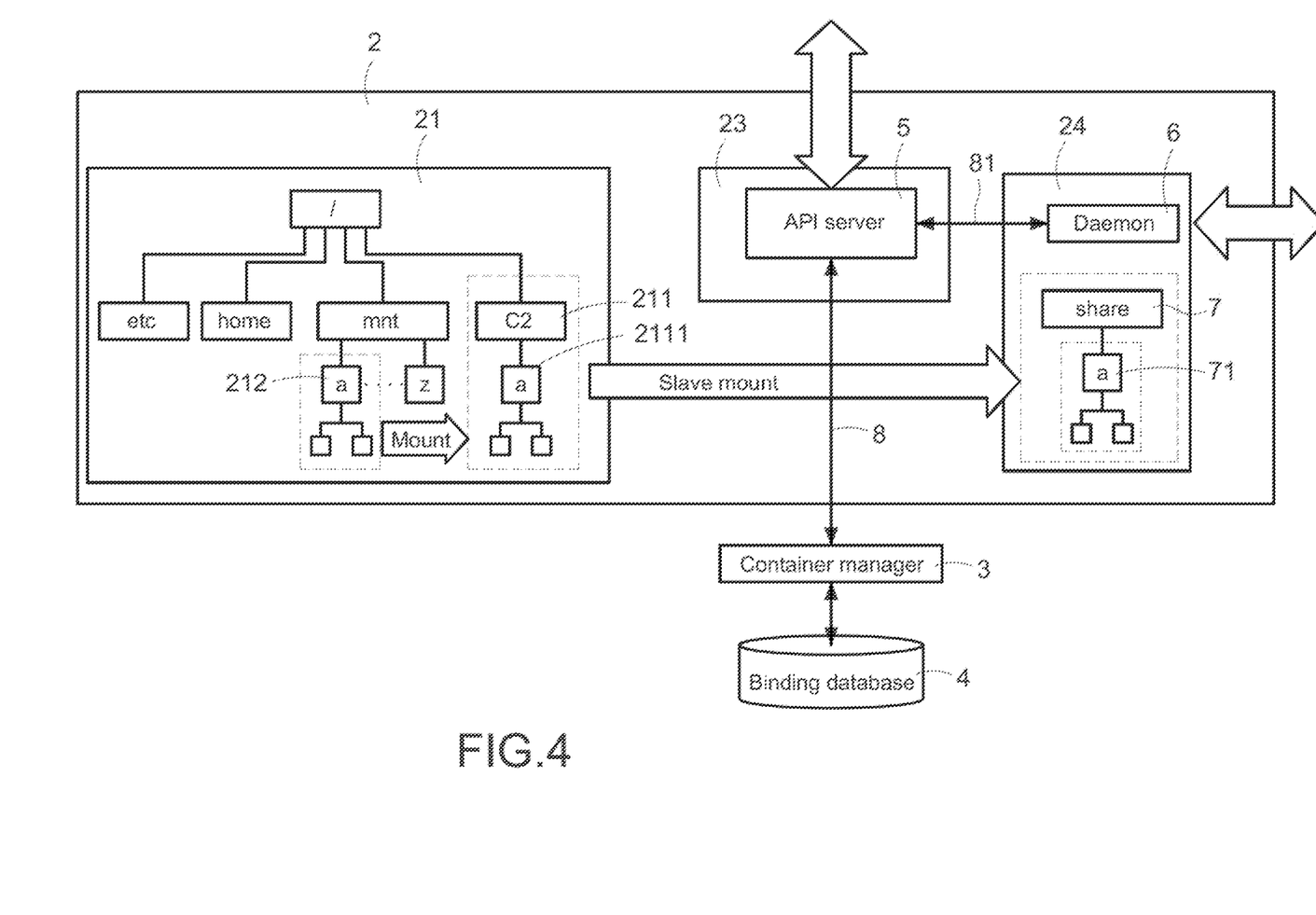
FIG. 4 is a schematic diagram of the third embodiment of the container system in the disclosure.

Please refer to FIG. 4, which is a schematic diagram of the third embodiment of the container system in the disclosure. As described above, when the container manager 3 receives the request command from the API server 5, the container manager 3 may inquiry the location of the target directory 212 (the target directory 212 in FIG. 4 uses the "/mnt/a" directory as an example) designated by the request command in the FS 21. Further, the container manager 3 bind-mounts the target directory 212 to the source sub-directory 2111 (the source sub-directory 2111 in FIG. 4 uses the "/C2/a" sub-directory as an example) of the source directory 211.

As shown in FIG. 4, when the container manager 3 instantiates the second container 24, the container manager 3 is configured to directly slave-mount the source directory 211 to the share directory 7 used by the daemon 6. Based on the characteristics of the slave-mounting mechanism, when the target directory 212 is bind-mounted to the source sub-directory 2111, the bind-mounting relation automatically appears on the share directory 7 of the second container 24, and further the target directory 212 automatically appears as the share sub-directory 71 (indicated as "/share/a" sub-directory in FIG. 4 for an example) under the share directory 7 of the second container 24.

As mentioned above, when the target directory 212 is bind-mounted to the source sub-directory 2111, the corresponding share sub-directory 71 automatically appears under the share directory 7 which has slave-mounting relationships with the source directory 211. As a result, the container manager 3 may respond the API server 5 about the location of the target directory 212 in the share directory 7. Specifically, the container manager 3 may respond the API server 5 about the target directory 212 being the same as the share sub-directory 71 of—the second container 24. Accordingly, the API server 5 may request the daemon 6 to share the share sub-directory 71, and the second container 24 may share content of the designated target directory 212 through the share directory 7 for the internal computations or external users.

In some embodiments, the API server 5 is configured to receive the responses from the container manager 3 mainly through the IPC 8, and performs local communication with the daemon 6 through the IPC 81 to request the daemon sharing content of the share sub-directory 71. As a result, the risk of the hacker obtaining the entire FS 21 of the host 2 (after hacking the API server 5) and obtaining content of the share sub-directory 71 through the API server 5 may be lowered.

It is worth mentioning that one cluster may have multiple nodes deployed (that is, multiple nodes) simultaneously, and each node may be configured to run multiple containers. In the disclosure, if multiple nodes are included in the cluster, each node needs to run one container manager 3 to manage one or multiple containers in the node.

Figure 5:
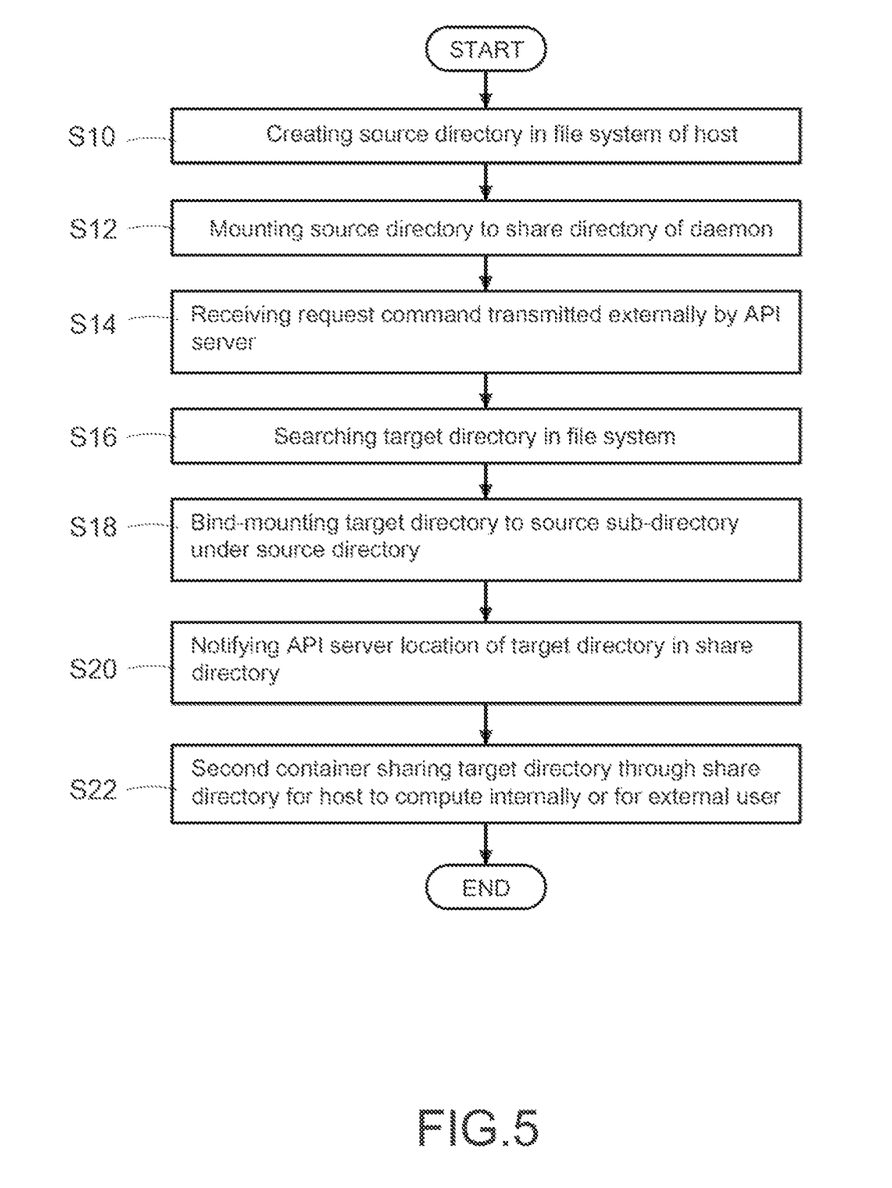
FIG. 5 is a flowchart of the first embodiment of the method of dynamically mounting in the disclosure.

Please refer to FIG. 5, which is a flowchart of the first embodiment of the method of dynamically mounting in the disclosure. The disclosure further discloses a method of dynamically mounting the host data to the container (hereafter as mounting method). The mounting method is mainly applied to the container system in FIG. 2, FIG. 3 and FIG. 4 to lower the risk of leaking data of the host 2 when sharing data through the daemon 6.

It is worth mentioning that, in one embodiment, the container manager 3 may be implemented by a program that runs in the host to provide specific services for other application programs of the host 2. For example, the host 2 may be a network attached storage (NAS), and the container manager 3 may run in the NAS to assist the API server 5 and the daemon 6 to implement the network accessing service through the container technology, here is not intended to be limiting.

The application program contains a computer executable code, when an electronic device, for example the hosts 2 in FIG. 2 to FIG. 4, executes the computer executable code, the container manager 3 is run on the electronic device to implement the specific steps of the mounting method as shown in FIG. 5.

As shown in FIG. 5, when the mounting method of the disclosure is being executed, first, the host 2 executes the container manager 3 in the host 2. Next, the container manager 3 is configured to create a source directory 211 in the FS 21 of the host 2 (step S10). Specifically, the purpose of creating the source directory 211 is to mount specific directory to the container without influencing the other directories in the FS 21. Therefore, in the step S10, the container manager 3 may randomly generate the directory name of the source directory 211 and randomly determine the location of the source directory 211 in the FS 21 to increase execution flexibility.

After the step S10, the container manager 3 may mount the source directory 211 to the share directory 7 of the daemon 6 (that is, the second container 24 shown in FIG. 4) (step S12). In some embodiments, the container manager 3 may mount the source directory 211 to share directory 7 of the daemon 6 in a slave-mounting manner in the step S12, and the daemon 6 may be, for example, Samba. Here is not intended to be limiting.

As shown in FIG. 4, the container system of the disclosure may configure a binding database 4 implemented by hardware or software in the host 2. After the step S10, the container manager 3 may be configured to write the related information of the source directory 211 into the binding database 4 managed by the container manager 3. Further, the container manager 3 is configured to collectively write the mounting relation between the source directory 211 and the share directory 7 of the second container 24 to be instantiated into the Config.

In the step S12, the container manager 3 is configured to read the Config from the binding database 4, and to instantiate the corresponding second container 24 according to content of the Config. Therefore, when the second container 24 is instantiated, the container manager 3 may be configured to run the daemon 6 in the second container 24, and make the daemon 6 have a share directory 7 which is already mounted with the source directory 211 of the host 2. In other words, the container manager 3 may instantiate the second container 24 in advance, and then create the mounting relation between the source directory 211 and the share directory 7, or the container manager 3 may create the mounting relation between the source directory 211 and the share directory 7 and store that as the Config, and then instantiate the second container 24 according to the Config.

When the second container 24 is instantiated, the container manager 3 may mount the source directory 211 to the share directory 7, but the container manager 3 does not need to mount additional sub-directories for the second container 24 (for example, as shown in FIG. 3, no data exists in the source directory 211 and the share directory 7). At that time, if the API server 5 in the first container 23 is configured to receive the request command input by the external administrator, the request command is transferred to the container manager 3 through the IPC 8. That is, the container manager 3 may be configured to receive the external request commands through the API server 5 (step S14).

After the request command is received, the container manager 3 may be configured to analyze content of the request command. For example, when the external administrator needs to use a target directory 212 (such as the "/mnt/a" directory shown in FIG. 4) in the FS 21, the external administrator may input the corresponding request command to the API server 5 with respect to the target directory 212. After the request command is received and analyzed, the container manager 3 may be configured to locate the target directory 212 in the FS 21 (step S16).

After the target directory 212 is successfully located, the container manager 3 may be configured to further bind-mount the target directory 212 to the source sub-directory 2111 (for example, the "/C2/a" sub-directory shown in FIG. 4) under the source directory 211 (step S18). The detail description for the bind-mounting mechanism is omitted here for brevity.

As described above, the container manager 3 is configured to mount the source directory 211 to the share directory 7 of the second container 24 mainly through the slave-mounting mechanisms. Based on the characteristics of the slave-mounting mechanisms, when the target directory 212 is bind-mounted to the source sub-directory 2111, the bind-mounting relation automatically appears on the share directory 7, and further the target directory 212 automatically appears as the share sub-directory 71 (indicated as "/share/a" sub-directory in FIG. 4 for an example) under the share directory 7. Therefore, after the step S18, the container manager 3 may respond the API server 5 about the location of the target directory 212 in the share directory 7 (step S20).

Specifically, in the step S14, the container manager 3 may be configured to receive the request from the API server 5 of mounting the target directory 212 to the second container 24. In the step S20, the container manager 3 may respond the API server 5 that the target directory 212 is the share sub-directory 71 in the second container 24.

After the step S20, the API server 5 is configured to transmit the sharing request to the daemon 6 through the IPC 81 to make-daemon 6 in second container 24 share the target directory 212 (that is, sharing sub-directory 71) of the share directory 7 for internal computations of the host 2, or for external users (step S22).

As described above, the container manager 3 may be configured to read the Config from the binding database 4, and instantiate the corresponding second container according to content of the Config. If the Config of the container is existed in the binding database 4, it indicates that the container was instantiated before and terminated afterward (or the host 2 is being rebooted). If the Config of the container is not existed in the binding database 4, it indicates that the container is being instantiated for the first time. Therefore, whether the container has been ever instantiated or not may affect the creating operation of the container manager 3.

Figure 6:
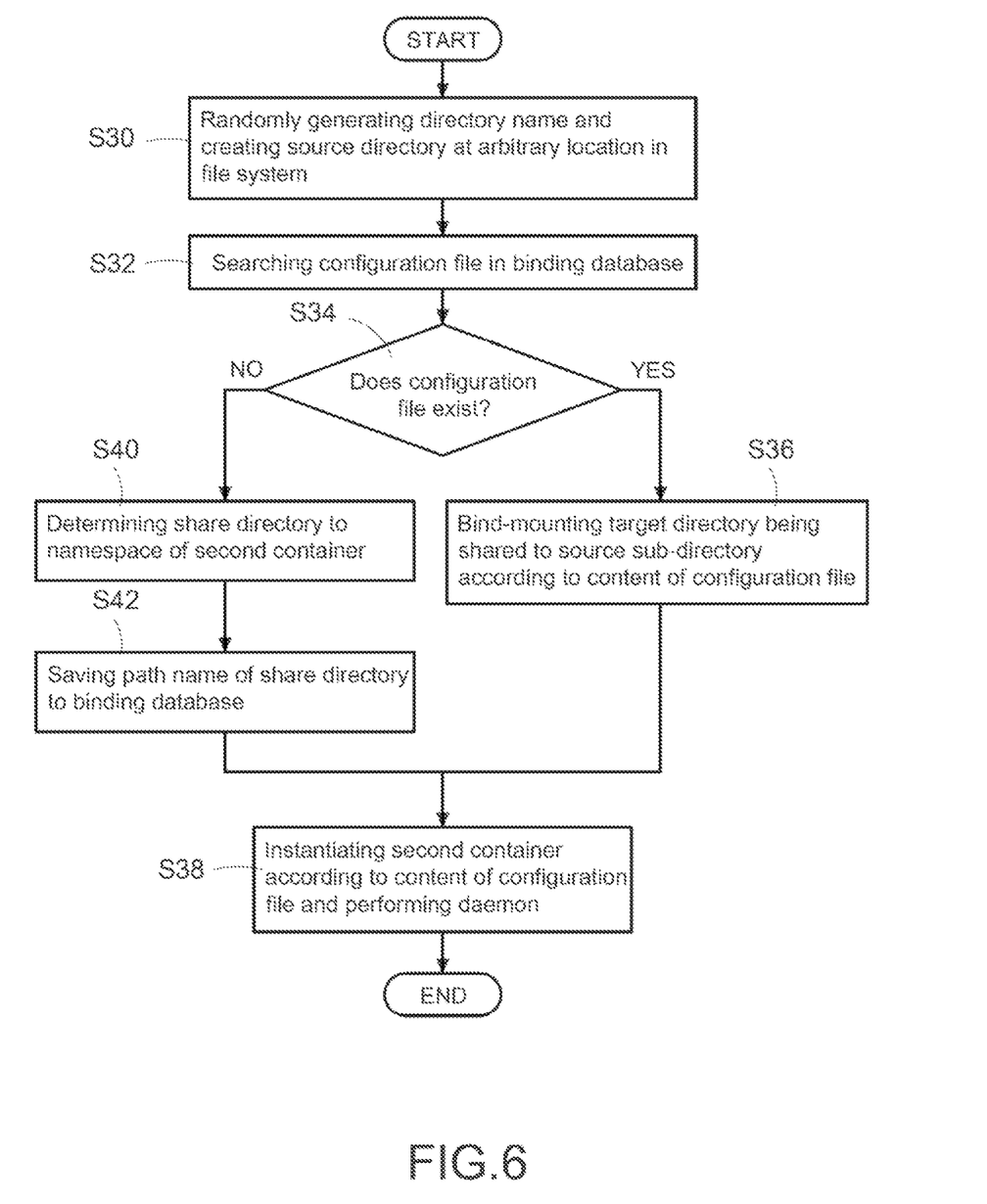
FIG. 6 is a flowchart of the first embodiment of creating the container in the disclosure.

Please refer to FIG. 6, which is a flowchart of the first embodiment of instantiating the container in the disclosure. As described above, the mounting method of the disclosure is mainly to slave-mount the source directory 211 in the FS 21 of the host 2 to the share directory 7 of the second container 24. Thus, before the mounting method is executed, the container manager 3 needs to create the source directory 211 and to instantiate the second container 24.

In some embodiments, the container manager 3 is configured to randomly generate a directory name (for example, the "C2" shown in FIG. 4), and create the source directory 211 on arbitrary location of the FS 21 (step S30). Next, the container manager 3 is configured to search the Config of the second container 24 to be instantiated in the binding database 4 (step S32), and determine whether the Config of the second container 24 to be instantiated is existed in the binding database 4 or not (step S34).

In some embodiments, the Config is the data recorded in the binding database 4 after the second container 24 was previously instantiated by the container manager 3, and may, for example, include at least one of the path name of the share directory 7 in the second container 24, the mounting relation between the source directory 211 and the share directory 7, and the bind-mounting relation between the target directory 212 and the source sub-directory 2111.

As described above, the Config may already exist in the binding database 4 (that is, the second container 24 has been instantiated and terminated afterward), or not exist in the binding database 4 (that is, the second container 24 has never been instantiated before). If the container manager 3 determines that the Config is existed in the binding database 4 at the step S34, the container manager 3 is configured to bind-mount the target directory 212 being shared to the source sub-directory 2111 according to content of the Config (step S36). After the step S34, the container manager 3 may be configured to instantiate the second container 24 according to the Config and run the daemon 6 (step S38).

Specifically, in the step S38, the container manager 3 may be configured to instantiate the second container 24 according to the mounting relation between the source directory 211 and the share directory 7 recorded in the Config. After the second container 24 is instantiated, the second container 24 already has the share directory 7, and the share directory 7 already has slave-mounting relationships to the source directory 211. Therefore, the source sub-directory 2111 automatically appear in the share sub-directory 71 of the share directory 7 because of the characteristic of slave mounts, and the container manager 3 does not need to do additional configuration actions.

If the container manager 3 determines that the Config is not existed in the binding database 4 at the step S34, it indicates that the second container 24 has never been instantiated. The container manager 3 is configured to determine the share directory 7 going to be created in the second container 24 in advance (step S40), and store the path name of the share directory to the binding database 4 for the Config of the second container 24 (step S42). After the step S42, the container manager 3 is configured to instantiate the second container 24 according to the mounting relation between the source directory 211 and the share directory 7, and run the daemon 6 (step S38).

Figure 7:
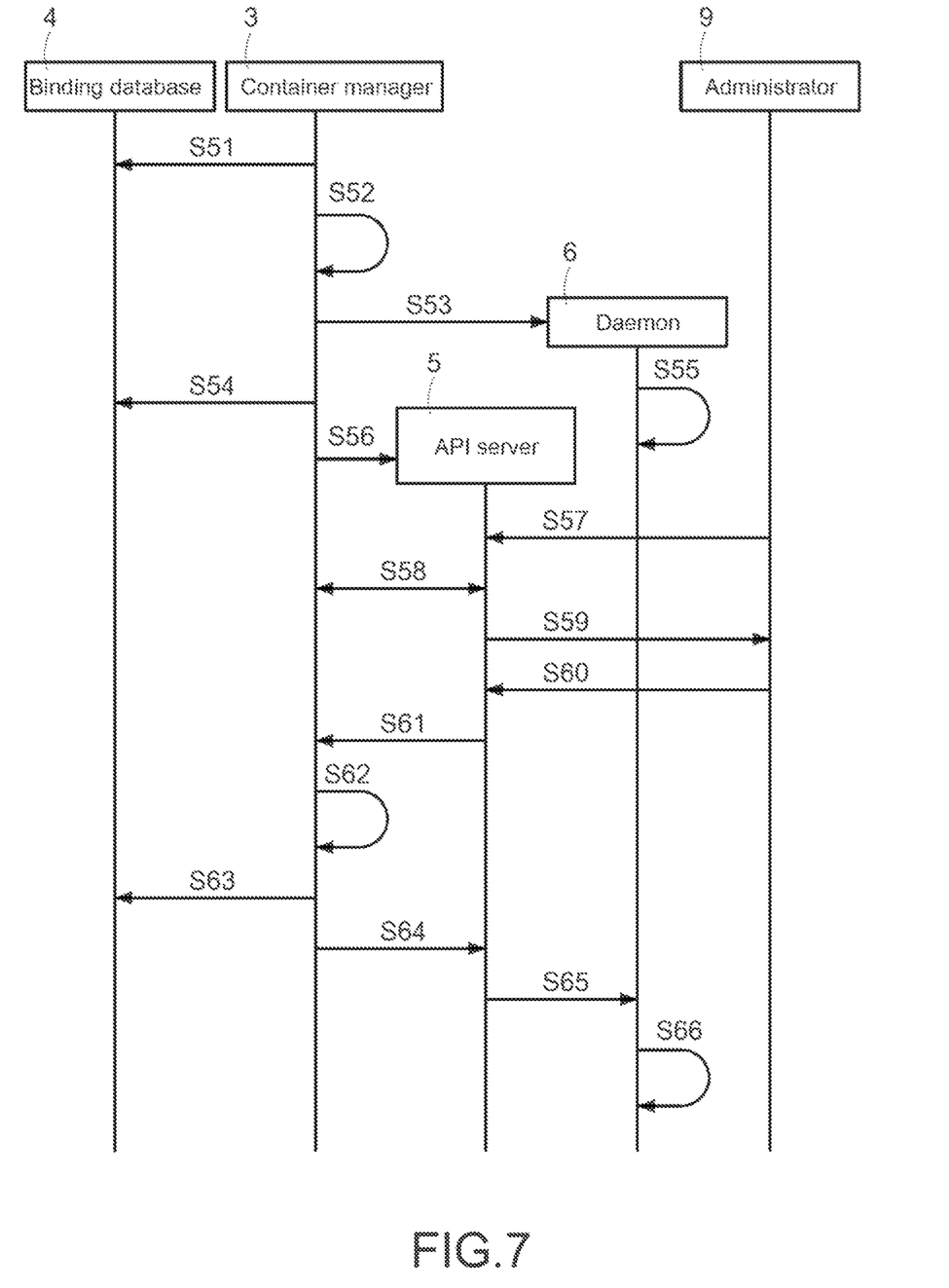
FIG. 7 is a sequence diagram of the first embodiment of the method of dynamically mounting in the disclosure.

Please refer to FIG. 7, which is a sequence diagram of the first embodiment of the method of dynamically mounting in the disclosure. FIG. 7 is a sequence diagram to further describe the interactions among the container manager 3, binding database 4, API server 5 (that is, the first container 23), daemon 6 (that is, the second container 24), and administrator 9.

As shown in FIG. 7, first, the host is configured to run the container manager 3. After the container manager 3 runs, it queries the binding database 4 and gets that the host sub-directory 212 was shared to share directory 7 of the second container 24 (step S51). Next, the container manager 3 is configured to create the source directory 211 (for example, the "/C2" directory shown in FIG. 4) in the FS 21 of the host 2, and then bind-mount the target directory 212 (if existed) obtained at the step S51 to the source sub-directory 2111 (for example, the "/C2/a" sub-directory shown in FIG. 4) of the source directory 211 (step S52).

After the step S52, the container manager 3 may be configured to instantiate the second container 24, run the daemon 6 (for example, Samba) in the second container 24, and slave-mount the source directory 211 to the share directory 7 (for example, the "/share" directory shown in FIG. 4) of the second container 24 (step S53). Further, the container manager 3 may use the share directory 7 as the root directory of the second container 24 and the root directory may be stored to the binding database 4 as part of the Config of the second container 24 (step S54).

After the second container 24 is instantiated, the daemon 6 may share content of the sub-directory in the share directory 7 according to its own configuration (step S55) to implement the main function of the daemon 6 (such as, Samba).

After the second container 24 is instantiated to run the daemon 6, the container manager 3 may be configured to further instantiate the first container 23, and run the API server 5 in the first container 23 (step S56).

After the first container 23 is instantiated to run the API server 5, the administrator 9 may request (step S57) the API server 5 from the Internet to return a list of shareable directories of the host 2.

After the list request is received, the API server 5 is configured to transfer that to the container manager 3 through the IPC 8 to request the container manager 3 for providing a list of the shareable directories. After the container manager 3 received the list request, the container manager 3 is configured to search the FS 21 of the host 2 and produce list of the shareable directories of the host 2, and respond that to the API server 5 through the IPC 8 (step S58). After the API server 5 received the list, the API server 5 is configured to respond the list to the administrator (step S59).

When the administrator 9 receives the list, the administrator 9 may know what directories are shareable in the FS 21 of the host 2 instantly. Therefore, the administrator 9 may input the request command to the API server 5 with respect to the required target directory 212 (for example, the "/mnt/a" shown in FIG. 4) according to the practical needs (step S60) to request for sharing the target directory 212. In other words, the target directory 212 being requested for sharing by the administrator 9 definitely exists in the list of shareable directories provided by the container manager 3.

It is worth mentioning that content of list of the shareable directories may be determined by the container manager 3 for lowering information security risk to prevent the administrator 9 from directly sharing all data in the FS 21 of the host 2.

After the request command is received, the API server 5 is configured to transfer that to the container manager 3 through the IPC 8 to request the container manager 3 for mounting the target directory 212 to the second container 24 (step S61). After the container manager 3 received the request command, the container manager 3 is configured to create a source sub-directory 2111 (for example, the "/C2/a" shown in FIG. 4) under the source directory 211, and bind-mount the target directory 212 in the FS 21 to the source sub-directory 2111 (step S62). Further, the container manager 3 is configured to record the bind-mounting relation to the binding database 4 (step S63).

After the step S62, the target directory 212 automatically appears as the share sub-directory 71 of the share directory 7 of the second container 24 because of the characteristics of slave mounts. Therefore, the container manager 3 may respond the API server 5 through the IPC 8 that the requested target directory 212 is the share sub-directory 71 in the second container 24 (step S64).

After the response from the container manager 3 is received, the API server 5 is configured to request the daemon 6 through IPC 81 for sharing the share sub-directory 71 (step S65). At that time, the daemon 6 is configured to share the share sub-directory 71 based on the request from the API server 5 to provide the host 2 for internal computation, or the external administrator 9 or the other users. Further, the daemon 6 is configured to record the sharing action and sharing content in its own configuration (step S66).

As described above, all of the mounting actions in the mounting method of the disclosure are stored to the binding database 4 by the container manager 3. When the container (particularly the second container 24 which runs the daemon 6) needs to be re-instantiated or the host 2 needs to be rebooted, the container manager 3 may use the Config recorded in the binding database 4 to recover the mount points. As a result, the disclosure may be applicable to the scenario of the long-lived containers, and also applicable to the scenario of the short-lived ones or being re-instantiated repeatedly.

The mounting method of the disclosure is that the target directory 212 is being bind-mounted to the source sub-directory 2111 and the share sub-directory 71 automatically appears in the second container 24 because of characteristics of slave mounts. Further, the API server 5 is configured to communicate with the daemon 6 and the container manager 3 through the IPC 81 for lowering the information security risk. In order to further lower the risk of leaking data of the host 2, the mounting method of the disclosure may include the action of unmounting the target directory 212 (and the source sub-directory 2111 and share sub-directory 71) after the share procedure of the daemon 6 is completed.

Figure 8:
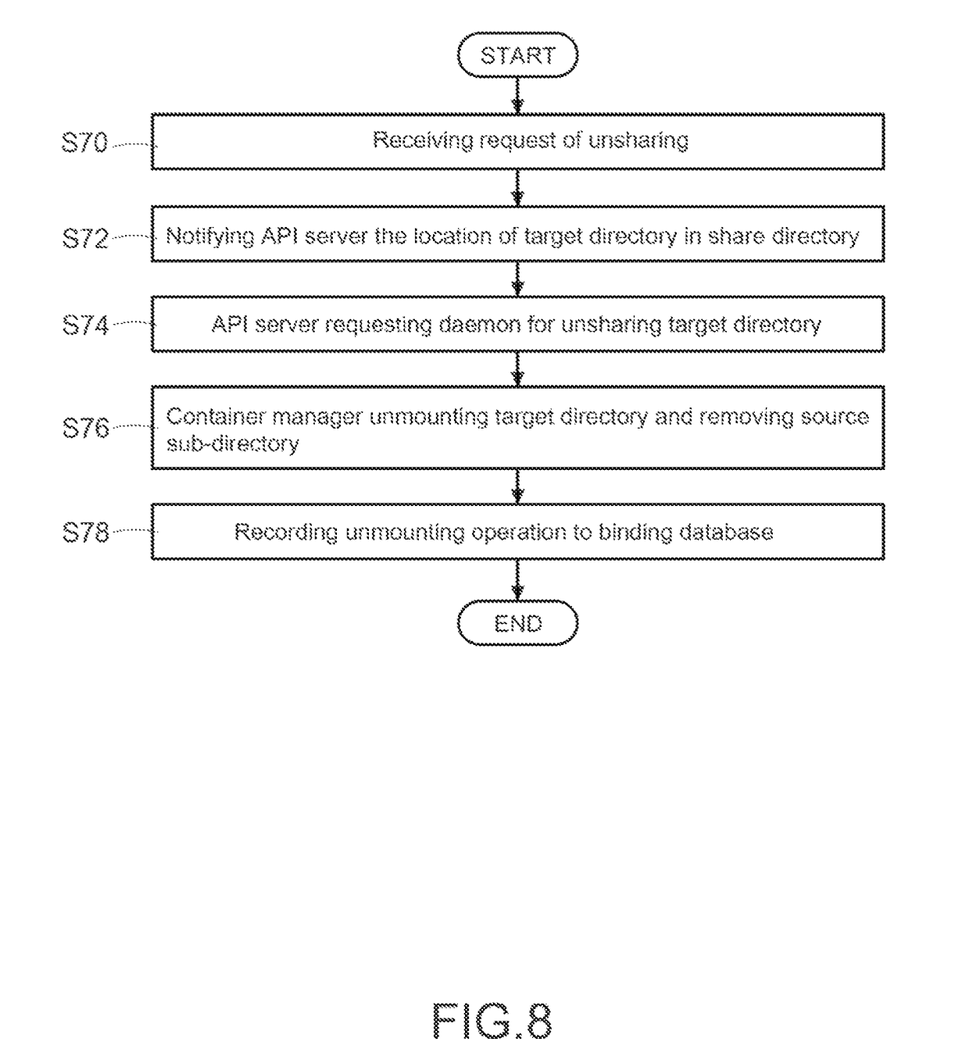
FIG. 8 is a flowchart of the first embodiment of the method of dynamically unmounting in the disclosure.

Please refer to FIG. 8, which is a flowchart of the first embodiment of the method of dynamically unmounting in the disclosure. As described above, the daemon 6 may already share the share sub-directory 71 according to a prior request from the API server 5. When the API server 5 receives the unsharing request, it may indicate that the administrator 9 or the other users no longer need the related data. At that time, the API server 5 is configured to transfer the unsharing request to the container manager 3 through the IPC 8.

The container manager 3 is configured to receive the unsharing request from the API server 5 through the IPC 8 (step S70). In some embodiments, the unsharing request is input by the administrator with respect to the target directory 212 in the FS 21 of the host 2.

After the step S70, the container manager 3 responds the API server 5 about the location of the target directory 212 in the share directory 7 of the second container 24 through the IPC 8 (step S72). As a result, the API server 5 may be configured to communicate with the daemon 6 through the IPC 81 to request the daemon 6 for unsharing the target directory 212 (that is, the share sub-directory 71) (step S74).

After the step S74, the daemon 6 is configured to unshare, and thus the target directory 212 does not need to be bind-mounted to the source sub-directory 2111. At that time, the container manager 3 is configured to unmount the target directory 212 and remove the source sub-directory 2111 (step S76). As a result, the risk of data in the FS 21 being leaked is effectively lowered.

Moreover, the container manager 3 is configured to further record the unmounting action executed in the step S76 to the binding database 4 (step S78). In some embodiments, the binding database 4 is stored in the persistent storage of the system. Even the host 2 is shut down or interrupted of power supply, the Config recorded in the binding database 4 are persistently stored. As a result, when the second container 24 is re-instantiated or the host 2 is rebooted, the container manager 3 may be configured to automatically and rapidly restore the entire system to state before being re-instantiated or rebooted according to the binding database 4.

Figure 9:
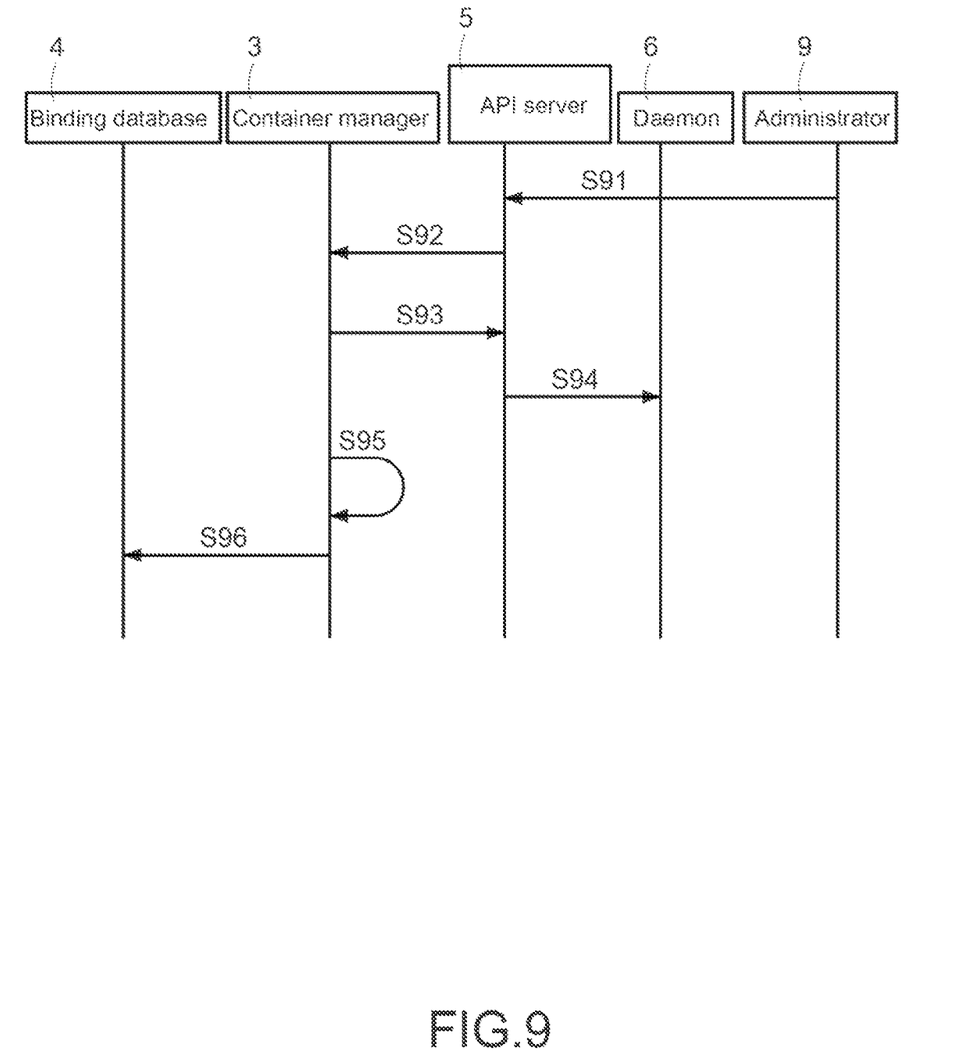
FIG. 9 is a sequence diagram of the first embodiment of the method of dynamically unmounting in the disclosure.

Please refer to FIG. 9, which is a sequence diagram of the first embodiment of the method of dynamically unmounting in the disclosure. FIG. 9 uses the sequence diagram to further describe the unmounting operation of the container manager 3.

As shown in FIG. 9, when the administrator 9 no longer needs the shared data, the administrator may input the unsharing request to the API server 5 (step S91). When the API server 5 receives the unsharing request, the API server 5 transfers that request to the container manager 3 through the IPC 8 (step S92). When the container manager 3 receives the unsharing request, the container manager 3 is requested from content of the unsharing request that the administrator 9 requires to un-share the target directory 212, and thus the container manager 3 is configured to respond the API server 5 through the IPC 8 that the target directory 212 (for example, the "/mnt/a" shown in FIG. 4) is the share sub-directory 71 (for example, the "/share/a" shown in FIG. 4) in the second container 24 (step S93).

After the response from the container manager 3 is received, the API server 5 is configured to communicate with the daemon 6 through the IPC 81 and request the daemon 6 to un-share the share sub-directory 71 (step S94). After the request from the API server 5 is received, the daemon 6 may be configured to cease the sharing.

After the step S93, the container manger 3 may be notified from the unsharing request that the administrator does not need to access the target directory 212, and thus the target directory 212 is unmounted and the source sub-directory 2111 (for example, the "/C2/a" shown in FIG. 4) under the source directory 211 is removed (step S95). At the end, the container manager 3 is configured to record the unmounting action to the binding database 4 (step S96). As a result, when the second container 24 is re-instantiated, the share sub-directory 71 is not being automatically mounted to the share directory 7 for lowering the information security risk.

The disclosure divides the application program into an API server and a daemon in the architecture, and run them in two distinct containers. Further, the disclosure makes the container mount the minimal host data, and makes the container manager dynamically mount the specific host data when requested by the administrator. Therefore, the risk of leaking data of the host is effectively lowered because of only a minimal amount of host data is exposed to the containers and which in turn is exposed to the external world.

While this disclosure has been described by means of specific embodiments, numerous modifications and variations may be made thereto by those skilled in the art without departing from the scope and spirit of this disclosure set forth in the claims.

What is claimed is:

1. A container system, comprising:
   a host, being a computer equipment with a processor and a memory, and the host comprising a file system having a plurality of directories,
   a daemon, configured to run in a container of the host, and the container comprising at least one share directory;
   a container manager, configured to run in the host, create a source directory in the file system, and mount the source directory to the share directory; and
   an application programming interface server (API server), configured to receive a request command for a target directory in the file system from an external administrator, and transfer the request command to the container manager,
   wherein the container manager is configured to bind-mount the target directory to a source sub-directory of the source directory according to the request command and respond the API server about a location of the target directory in the share directory, and the container is configured to share the target directory through the share directory for an internal computation or an external user;
   wherein the processor is configured to execute instructions in the memory to implement the daemon, the container manager, and the API server on the host.

2. The container system according to claim 1, wherein the source directory is mounted to the share directory in a slave-mounting manner, and after the target directory is bind-mounted to the source sub-directory, the target directory automatically appears as a share sub-directory of the share directory through characteristic of the slave-mounting manner, and
   the container is configured to share the share sub-directory for the internal computation or the external users.

3. The container system according to claim 2, wherein the API server and the daemon are configured to run in different containers of the host.

4. The container system according to claim 3, wherein the API server is configured to perform a local communication with the daemon through a first inter-process communication (IPC), transfer the request command to the container manager through a second IPC, and receive a response from the container manager.

5. The container system according to claim 4, further comprising:
   a binding database, storing a configuration file of the container, the configuration file comprising at least one of a path name of the share directory in the container, a mounting relation between the source directory and the share directory, and a bind-mounting relation between the target directory and the source sub-directory.

6. The container system according to claim 5, wherein the container manager is configured to search the binding database to obtain the configuration file, instantiate the container according to the configuration file, and run the daemon in the container.

7. A method of dynamically mounting a host data to a container, incorporated with a host comprising a file system, wherein the host is configured to run a daemon, an application programming interface server (API server), and a container manager, the API server is configured to run in a first container, the daemon is configured to run in a second container, the method comprising:
   a1) the container manager creating a source directory in the file system;
   a2) the container manager mounting the source directory to a share directory of the daemon;
   a) the container manager receiving a request command from the API server, wherein the request command is input by an external administrator with respect to a target directory in the file system;
   b) the container manager bind-mounting the target directory to a source sub-directory of the source directory according to the request command; and
   c) after b), the container manager responding the API server about a location of the target directory in the share directory to make the second container share the target directory through the share directory for an internal computation or an external user.

8. The method according to claim 7, wherein the a2) further comprises: mounting the source directory to the share directory through a slave-mounting manner; and
   the c) further comprises: after b), the target directory automatically appearing as a share sub-directory of the share directory through characteristic of the slave-mounting manner, and the second container share the share sub-directory for the internal computation or the external user.

9. The method according to claim 8, wherein the a) further comprises: the API server transferring the request command to the container manager through a first inter-process communication (IPC); and the c) further comprises: the API server receiving a response from the container manager through the first IPC and requesting the daemon through a second IPC for sharing the share sub-directory.

10. The method according to claim 9, wherein before the a), the method further comprises:
 a01) searching a configuration file of the second container in a binding database, wherein the configuration file comprises at least one of a path name of the share directory in the container, a mounting relation between the source directory and the share directory, and a bind-mounting relation between the target directory and the source sub-directory;
 a02) when the configuration file is existed in the binding database, bind-mounting the target directory being permitted for sharing to the source sub-directory; and
 a03) after a02), creating the second container based on the mounting relation between the source directory and the share directory, and running the daemon in the second container.

11. The method according to claim 10, wherein before the a), the method further comprises:
 a04) when the configuration file is non-existed in the binding database, determining the share directory to be created to a namespace of the second container;
 a05) storing a path name of the share directory to the binding database as the configuration file; and
 a06) creating the second container based on the mounting relation between the source directory and the share directory, and running the daemon in the second container.

12. The method according to claim 11, wherein before the a), the method further comprises:
 a07) the container manager instantiating the first container after the a03) or the a06), and running the API server in the first container.

13. The method according to claim 9, wherein before the a), the method further comprises:
 a08) the container manager receiving a searching request from the API server, wherein the searching request is input by the external administrator with respect to a sharable directory in the host; and
 a09) the container manager responding a list for the sharable directory to the API server according to the searching request to provide that for the external administrator, wherein the target directory is recorded in the list.

14. The method according to claim 9, further comprising:
 d) the container manager receiving a unsharing request from the API server, wherein the unsharing request is input by the external administrator with respect to the target directory;
 e) the container manager responding the API server about a location of the target directory in the share directory, and the API server requesting the daemon to un-share the target directory;
 f) the container manager unmounting the target directory and removing the source sub-directory; and
 g) recording unmounting operation to a binding database.

15. A non-transitory storage medium storing an application program having a computer executable code, after the computer executable code being executed by a host, the method according to claim 7 is implemented.

* * * * *